(12) United States Patent
Eltoft

(10) Patent No.: US 10,599,108 B2
(45) Date of Patent: Mar. 24, 2020

(54) BUILDING MANAGEMENT SYSTEM WITH DELTA VIEW MODE

(71) Applicant: Johnson Controls Technology Company, Milwaukee, WI (US)

(72) Inventor: Justin D. Eltoft, Pleasant Prairie, WI (US)

(73) Assignee: Johnson Controls Technology Company, Milwaukee, WI (US)

(*) Notice: Subject to any disclaimer, the term of this patent is extended or adjusted under 35 U.S.C. 154(b) by 50 days.

(21) Appl. No.: 15/858,577

(22) Filed: Dec. 29, 2017

(65) Prior Publication Data

US 2019/0204796 A1    Jul. 4, 2019

(51) Int. Cl.
| | |
|---|---|
| *G05B 15/02* | (2006.01) |
| *G06F 3/0484* | (2013.01) |
| *G06F 3/0481* | (2013.01) |
| *G05B 19/04* | (2006.01) |

(52) U.S. Cl.
CPC ......... *G05B 15/02* (2013.01); *G06F 3/04817* (2013.01); *G06F 3/04842* (2013.01); *G06F 3/04847* (2013.01)

(58) Field of Classification Search
CPC ...... G05B 19/0426; G05B 2219/23467; G05B 2219/31396; G05B 2219/32341

USPC .......................................... 700/117, 180, 275
See application file for complete search history.

(56) References Cited

U.S. PATENT DOCUMENTS

| | | | | |
|---|---|---|---|---|
| 2005/0044536 | A1* | 2/2005 | Kwong | ............... G06F 11/3636 717/128 |
| 2006/0250578 | A1* | 11/2006 | Pohl | ...................... G06F 3/0238 351/210 |

\* cited by examiner

*Primary Examiner* — Michael J Brown
(74) *Attorney, Agent, or Firm* — Foley & Lardner LLP

(57) ABSTRACT

A building management system includes building equipment that operate to affect a variable state or condition in a building, an interface generator configured to generate a graphical user interface, and a system manager. The graphical user interface includes user-configurable options with current settings that define a current system state. The user interface also includes a delta view mode button configured to allow a user to request to enter a delta view mode relative to a comparison system state defined by a comparison setting for each of the user-configurable options. The system manager is configured to identify one or more unchanged user-configurable options by determining the user-configurable options for which the current setting matches the comparison setting. The interface generator is further configured to hide the unchanged user-configurable options in the graphical user interface in response to a user request to enter the delta view mode.

20 Claims, 9 Drawing Sheets

BUILDING MANAGEMENT SYSTEM WITH DELTA VIEW MODE

BACKGROUND

The present disclosure relates generally to a building management system (BMS), and more particularly to a BMS with a graphical user interface that allows users to monitor, control, and manage building equipment. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

SUMMARY

One implementation of the present disclosure is a building management system. The building management system includes building equipment, an interface generator, and system manager. The building equipment operate to affect a variable state or condition in a building. The interface generator is configured to generate a graphical user interface. The graphical user interface includes user-configurable options associated with the building equipment, each user-configurable option having a current setting. The current settings of the user-configurable options define a current system state. The user interface also includes a delta view mode button configured to allow a user to request to enter a delta view mode relative to a comparison system state. The comparison system state is defined by a comparison setting for each of the user-configurable options. The system manager is configured to identify one or more unchanged user-configurable options by determining the user-configurable options for which the current setting matches the comparison setting. The interface generator is further configured to hide the unchanged user-configurable options in the graphical user interface in response to a user request to enter the delta view mode.

In some embodiments, the user interface also includes a navigation tree comprising an entry for each of a plurality of views of the user-configurable options. In some embodiments, the interface generator is further configured to determine that the user-configurable options shown in an unchanged view of the plurality of views are unchanged user-configurable options and hide the unchanged view on the navigation tree in response to a determination that the user-configurable options shown in the unchanged view are unchanged user-configurable options.

In some embodiments, the user interface further comprises a delta view mode entry portal that allows a user to choose the comparison system state. In some embodiments, the delta view mode entry portal includes an option for selecting an event tag corresponding to a tagged system state. The delta view mode entry portal allows the user to choose the comparison system state as the tagged system by selecting the event tag.

In some embodiments, the user-configurable options correspond to operations of the building equipment. The user interface allows a user to input a setting change for one of the user-configurable options. The system manager is configured to control the building equipment to conform the operations of the building equipment to the setting change.

In some embodiments, the building equipment operate in conformance with the current system state. The user interface allows a user to change the current system state to alter an operation of the building equipment Another implementation of the present disclosure is a method for managing building equipment in a building management system. The method includes operating building equipment to affect a variable state or condition of a building and generating a graphical user interface including user-configurable options associated with the building equipment. Each user-configurable option has a current setting. The current settings define a current system state. The method also includes accepting a request to compare the current system state to a comparison system state. The comparison state is defined by a comparison setting for each of the user-configurable options. The method also includes identifying one or more unchanged user-configurable options by determining the user-configurable options for which the current setting matches the comparison setting and hiding the one or more unchanged user-configurable options from the graphical user interface.

In some embodiments, the graphical user interface also includes a navigation tree that includes links to a plurality of views. Each view shows one or more user-configurable options. The method further includes determining that the user-configurable options shown in an unchanged view are unchanged user-configurable options and hiding a link to the unchanged view on the navigation tree.

In some embodiments, the method also includes accepting a user input to change a user-configurable option corresponding to the building equipment and controlling the building equipment to conform to the changed user-configurable option.

In some embodiments, accepting the request to comparing the current system state to the comparison system state includes providing, on the graphical user interface, an option to select an event tag corresponding to a tagged system state and selecting the tagged system state as the comparison system state in response to a user selection of the event tag. In some embodiments, accepting the request to compare the current system state to the comparison system state includes providing, on the graphical user interface, an option to select a preceding time corresponding to a historical system state and selecting the historical system state as the comparison system state in response to a selection of the preceding time.

In some embodiments, the current settings of user-configurable options correspond to current operations of the building equipment. A change to one or more of the user-configurable options causes a change to the current operations of the building equipment.

Another implementation of the present disclosure is a method for managing building equipment in a building management system. The method includes operating building equipment in conformance with a current system state defined by current settings of a plurality of user-configurable options and generating a user interface that includes the plurality of user-configurable options. The method also includes altering the user interface to compare the current system state to a comparison system state. The comparison system state is defined by comparison settings of the user-configurable options. Altering the user interface includes identifying one or more altered user-configurable options by determining the user-configurable options for which the current setting is the same as the comparison setting. Altering the user interface also includes showing the one or more altered user-configurable options on the user interface and hiding non-altered user-configurable options on the user interface.

In some embodiments, the user interface also includes a plurality of views, each view including a portion of the plurality of user-configurable options, and a navigation tree. The navigation tree includes a link to each of the plurality of views and is configured to allow a user to select each link to cause the user interface to show the corresponding view.

In some embodiments, the method further includes identifying one or more altered views from the plurality of views by determining that the portion of user-configurable options shown on each of the altered views includes at least one of the one or more altered user-configurable options. The method also includes showing the links to the one or more altered views on the navigation tree and hiding links to one or more non-altered views.

In some embodiments, the method also includes allowing a user to select the comparison state by providing, on the user interface, an option to select an event tag corresponding to a tagged system state and defining the tagged system state as the comparison system state in response to a user selection of the event tag via the user interface. In some embodiments, the method also includes allowing a user to select the comparison state by providing, on the user interface, an option to select a preceding time corresponding to a historical system state and defining the historical system state as the comparison system state in response to a user selection of the preceding time via the user interface.

In some embodiments, the user interface allows a user to change the current system state to an updated system state by altering the current setting of one of the user-configurable options. The method further includes controlling the building equipment to operate in conformance with the updated system state in response to a user change of the current system state. In some embodiments, the building equipment includes at least one of a chiller and a boiler.

DETAILED DESCRIPTION

Building HVAC Systems and Building Management Systems

Figure 1:
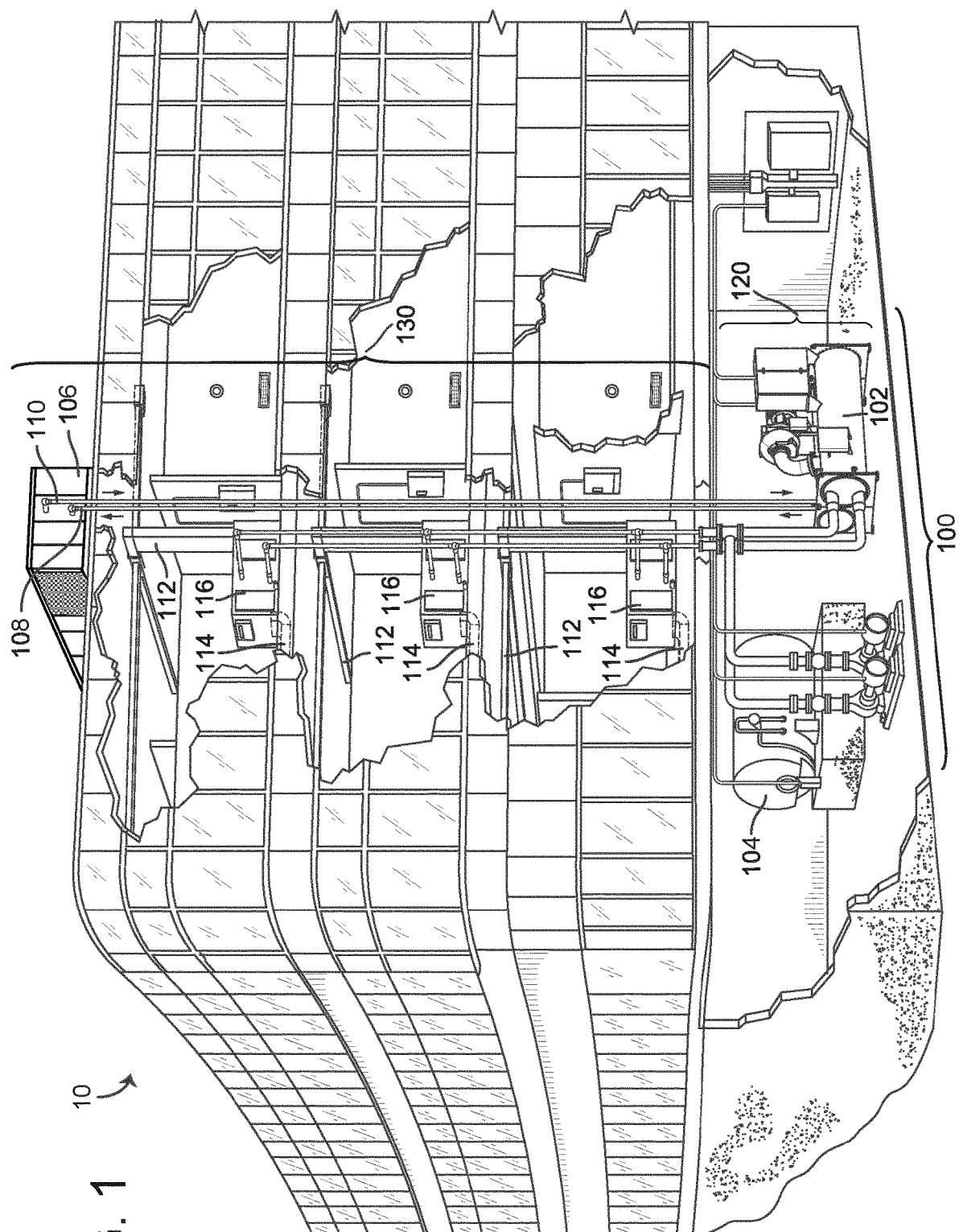
FIG. 1 is a drawing of a building equipped with a HVAC system, according to some embodiments.
Figure 2:
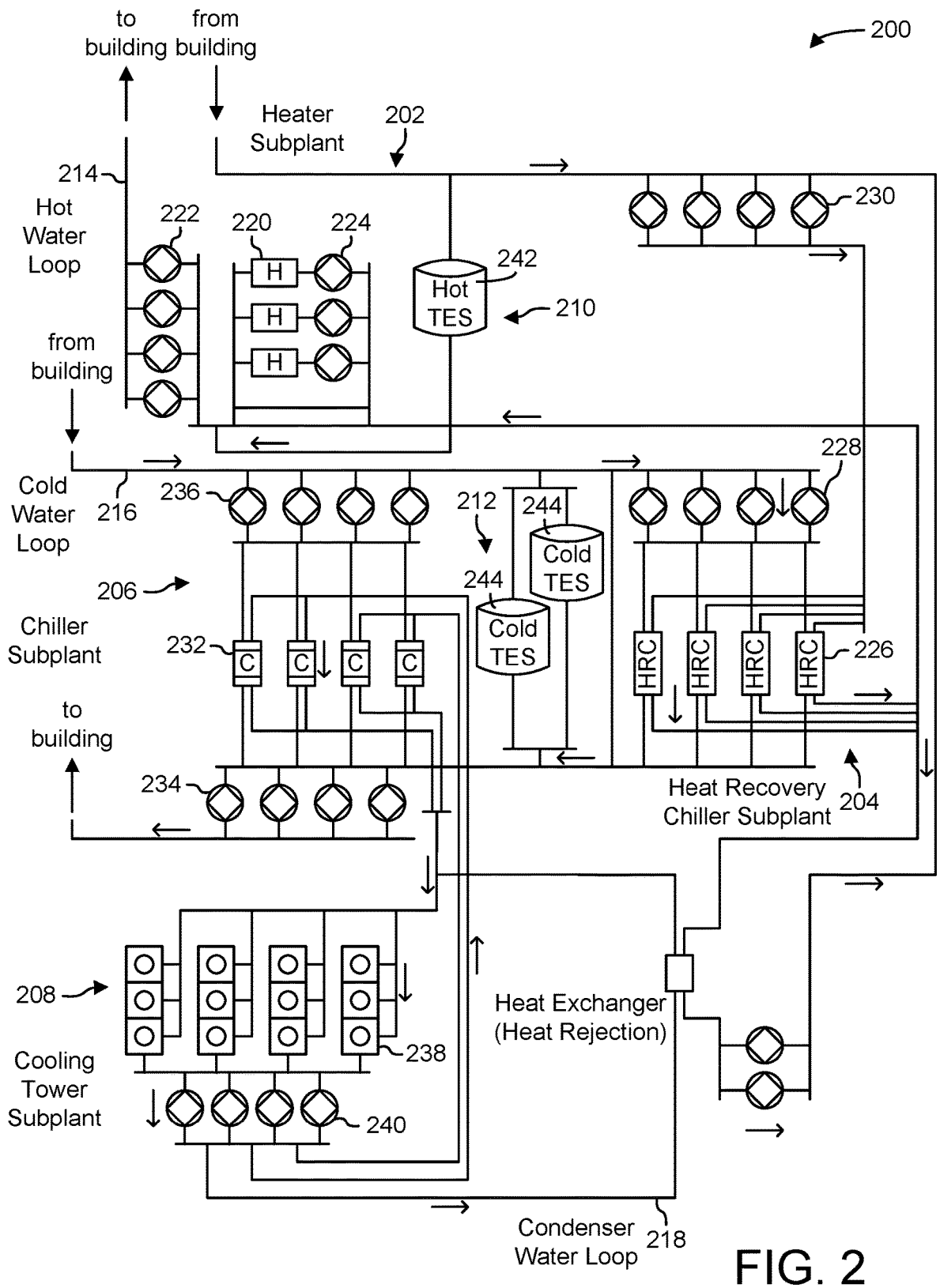
FIG. 2 is a block diagram of a waterside system which can be used to serve the building of FIG. 1, according to some embodiments.
Figure 3:
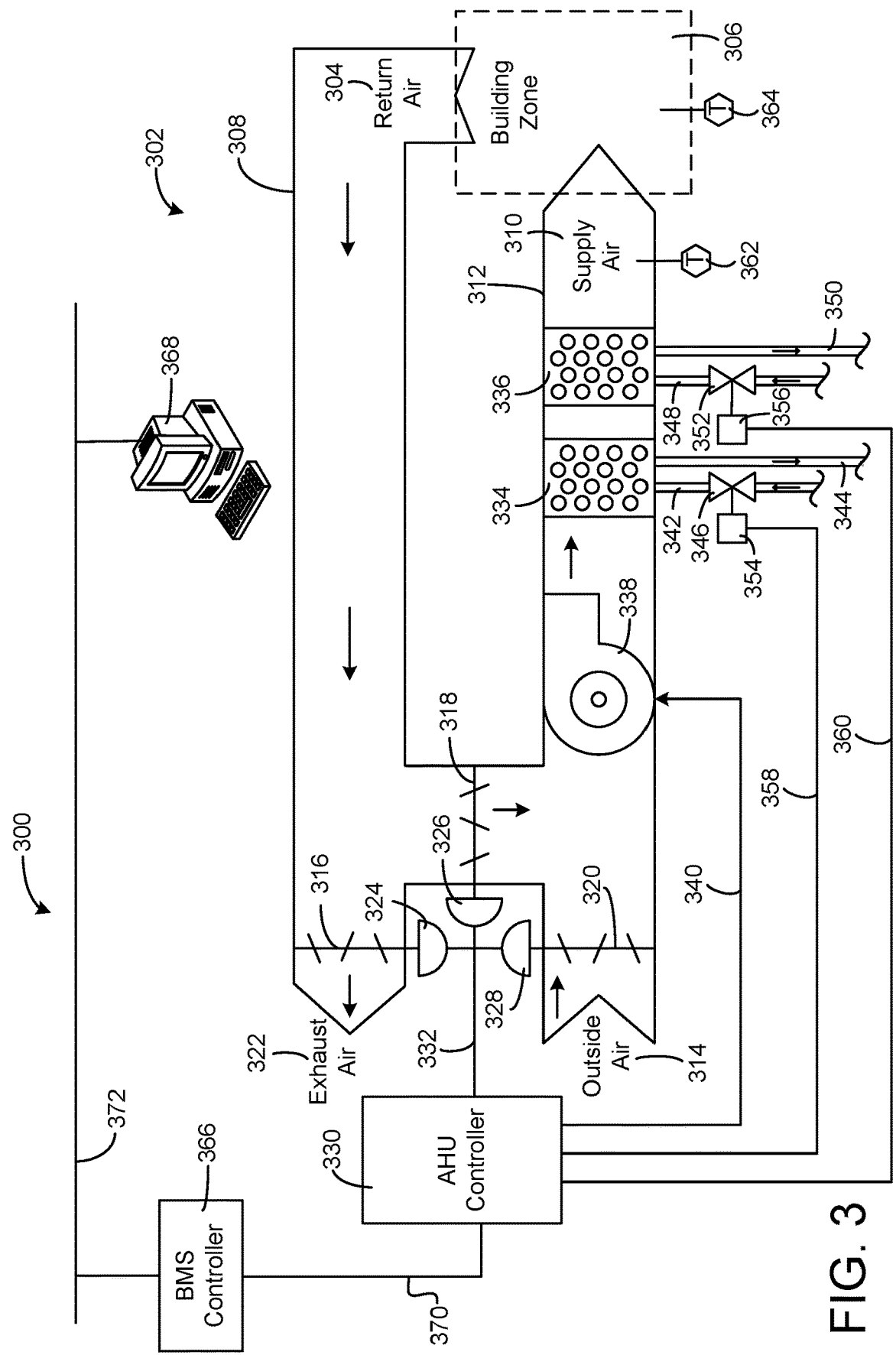
FIG. 3 is a block diagram of an airside system which can be used to serve the building of FIG. 1, according to some embodiments.
Figure 4:
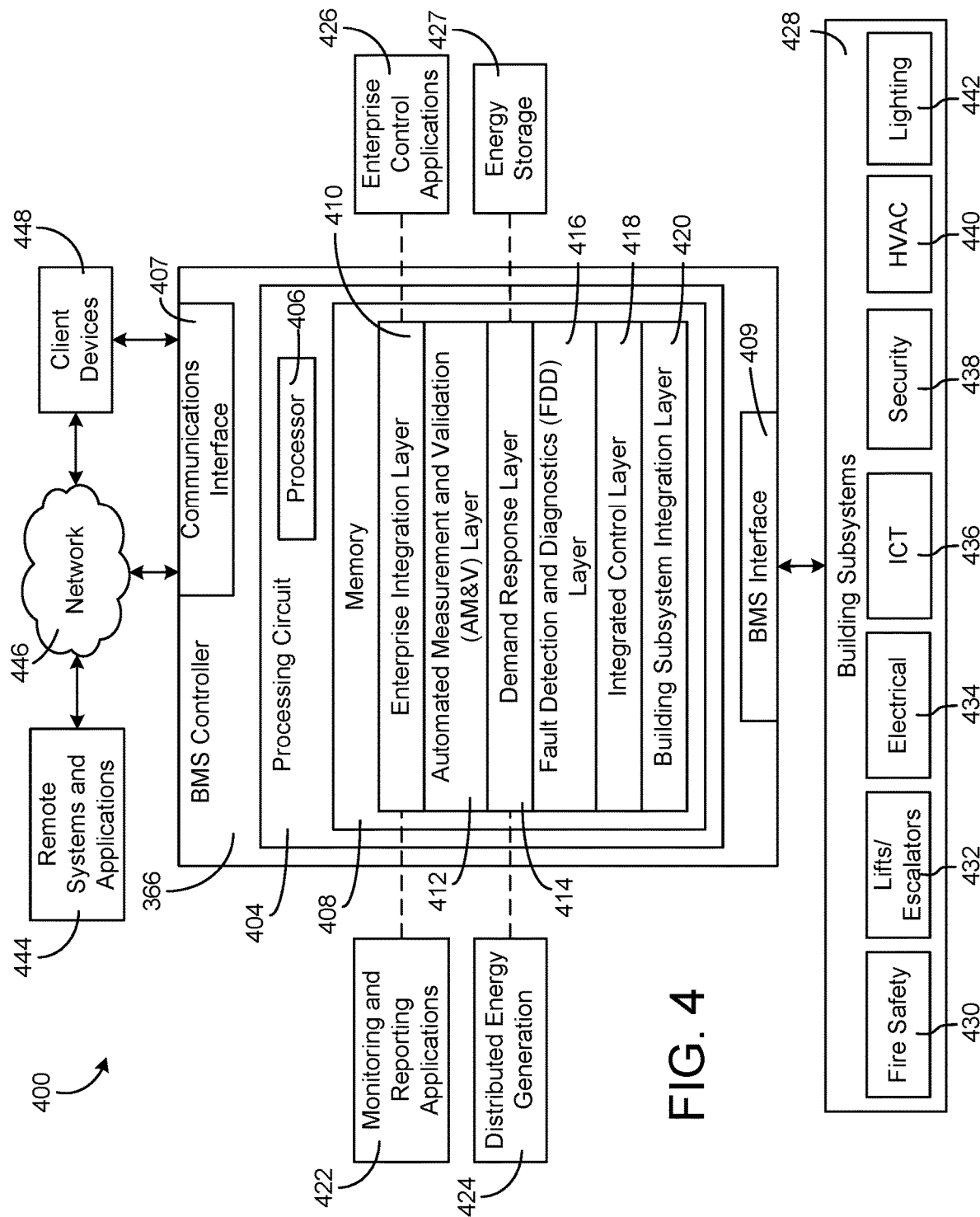
FIG. 4 is a block diagram of a building management system (BMS) which can be used to monitor and control the building of FIG. 1, according to some embodiments.
Figure 5:
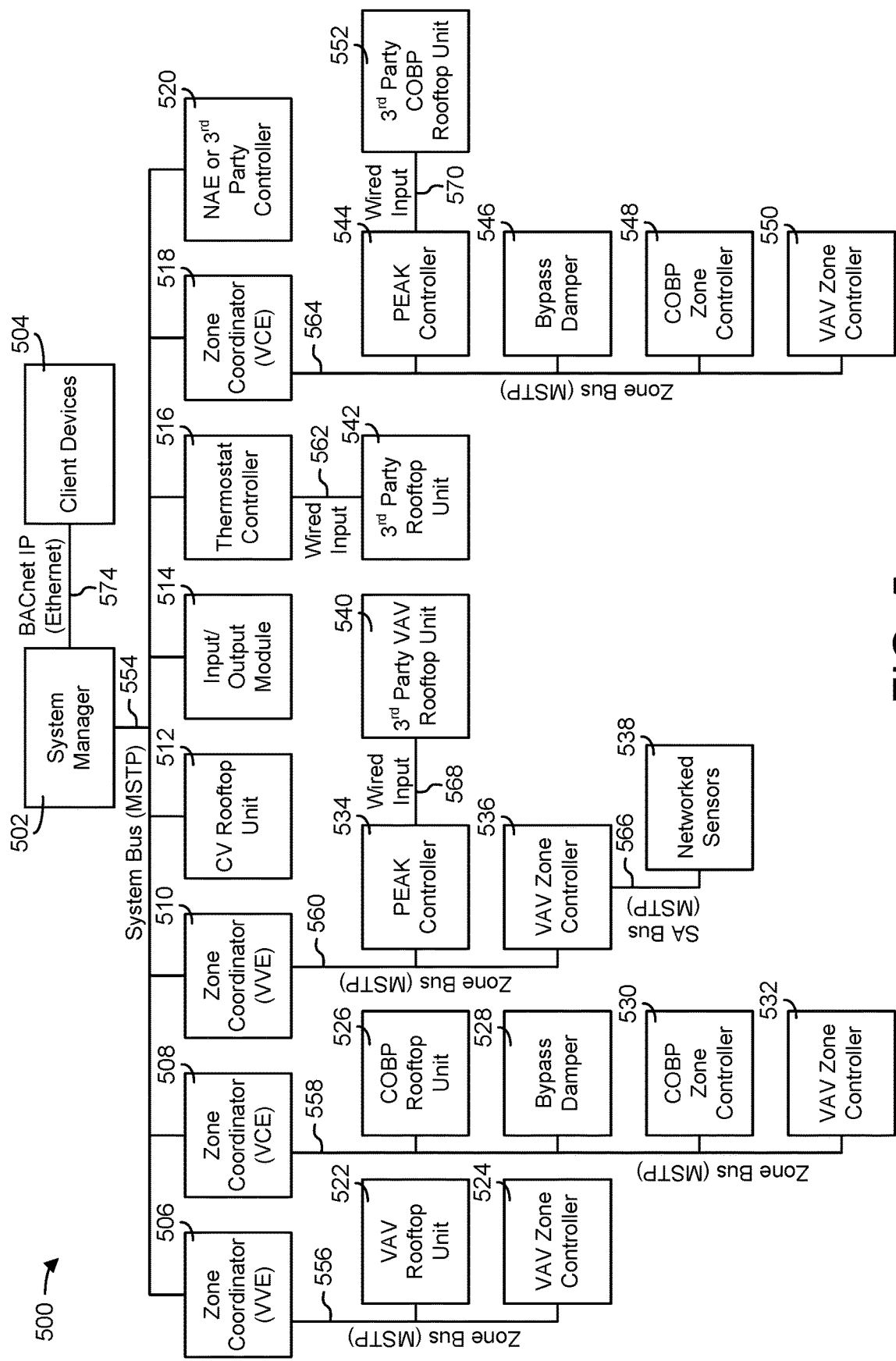
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD)

layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/ output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Delta View Mode in a BMS User Interface

Figure 6:
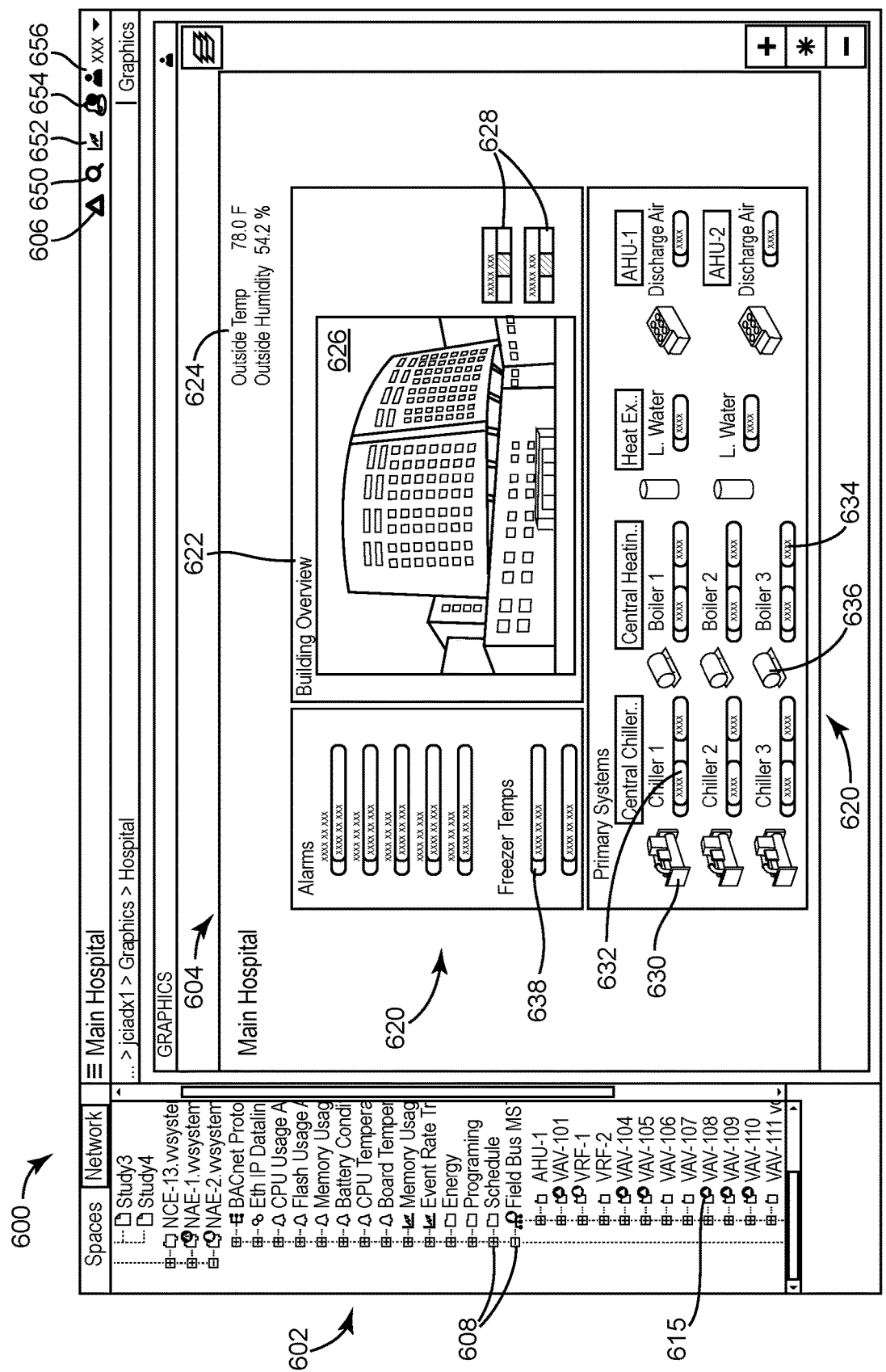
FIG. 6 is an illustration of a graphical user interface generated by the BMS of FIGS. 4-5, according to some embodiments.
Figure 7:
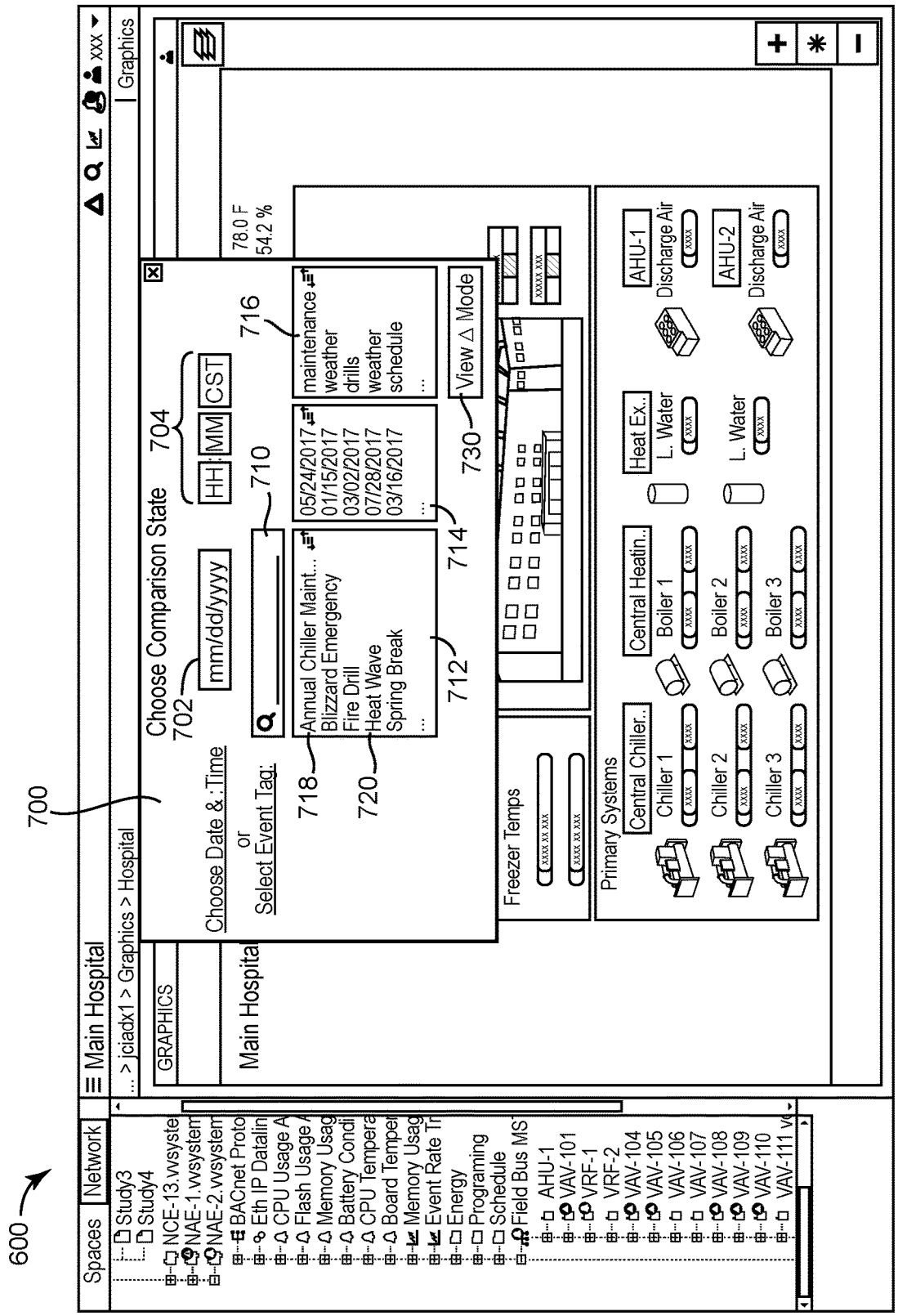
FIG. 7 is an illustration of the graphical user interface of FIG. 6 with a delta view entry portal, according to some embodiments.
Figure 8:
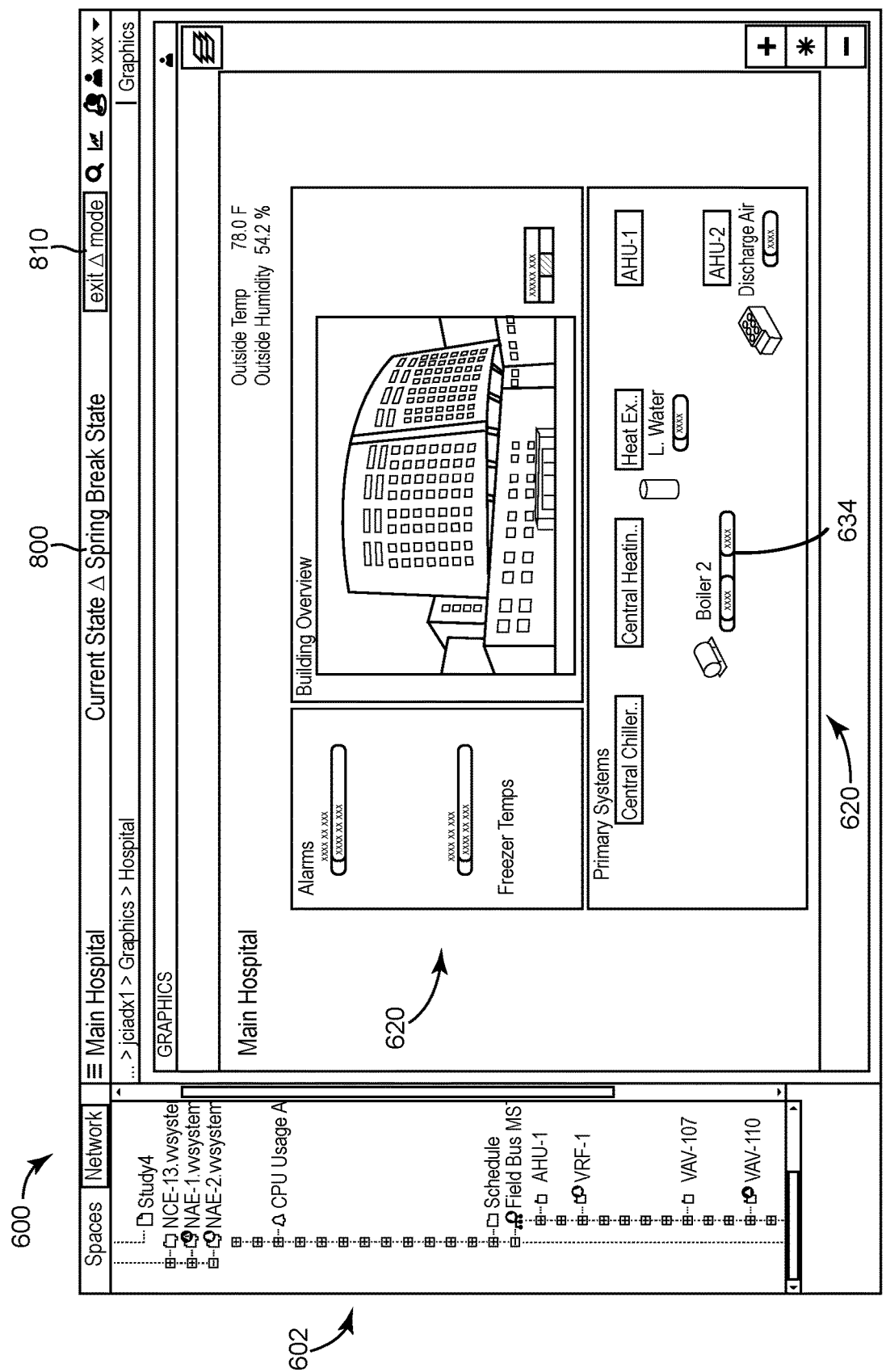
FIG. 8 is an illustration of the graphical user interface of FIG. 6 in delta view mode, according to some embodiments.

Referring now to FIGS. 6-8, several drawings illustrating a graphical user interface for altering user-configurable options in a BMS are shown, according to exemplary embodiments. The graphical user interface described below may be generated by any of the building management systems described with reference to FIGS. 1-5, and may be configured to accept user input to control, monitor, or manage any of the features or functions described with reference to FIGS. 1-5. For example, the graphical user interface may be generated by system manager 502 and transmitted to client devices 504 shown in FIG. 5. As described in detail below, users of the BMS (e.g., BMS 400, BMS 500), can then monitor, manage, and control the BMS using the graphical user interface presented on personal electronic devices (e.g., smartphones, tablets, laptops, desktop computers), such as client devices 504.

More particularly, user-configurable options may be provided to a user. User-configurable options include any setting, status, value, or other characteristic of a building, space, or equipment that a user can change to control and manage buildings, spaces, and equipment using the BMS. In some cases, the setting of a user configurable options is a schedule that lays out variations of one or more statuses, values, or characteristics over time. Some user-configurable options are directly tied to a unit of building equipment (e.g., an option to set a chiller as "on" or "off"), while other user-configurable options are associated with spaces or buildings (e.g., setting the temperature setpoint of a room to seventy degrees Fahrenheit). Thus, user-configurable options correspond to user inputs or potential user inputs to a user interface of a BMS. At a given point in time, the "system state" of the BMS, as used in the description below, is the combination of the configurations of all user-configurable options in the BMS. The BMS (e.g., BMS 400, BMS 500) may store a history of system states that can be recalled for use in generating the user interfaces described below.

FIG. 6 shows a BMS user interface 600. As shown in FIG. 6, the BMS user interface 600 includes a navigation tree 602, a selected view 604, and a delta mode button 606. Navigation tree 602 is a hierarchical list of buildings, spaces, and equipment, and, in some embodiments, other categories of options. Navigation tree 602 is collapsible and expandable by selecting an expand/collapse button 608 provided with each entry, and can include an entry for all available views in the BMS user interface 600. For a BMS configured for use with numerous buildings, spaces, and equipment, navigation tree 602 may include hundreds or thousands of entries. Navigation tree 602 includes attention indicators 610, which indicate list entries in the navigation tree 602 for which a user's attention may be needed. Each entry in navigation tree 602 can be selected to navigate to a view of the selected building, space, equipment, or category corresponding to that entry. For example, a user can select an entry "Main Hospital" on the navigation tree 602 to cause the BMS user interface to display the selected view 604 shown in FIG. 6.

Selected view 604 provides an overview of the user-configurable options for the building, space, equipment, or other category selected from the navigation tree 602. For example, selected view 604 shown in FIG. 4 shows the user-configurable options 620 for the building "Main Hospital." More particularly, selected view 604 includes multiple user-configurable options 620 grouped into several categories of settings and systems (e.g., "Alarms," "Freezer Temps," "Primary Systems"), a building overview widget 622, and a weather indicator 624.

Building overview widget 622 includes an image 626 or other graphical representation of a building (here, "Main Hospital") and space indicators 628 of floors or other subspaces in the building. Image 626 may serve to be a clear visual indicator of what building the selected view 604 corresponds to, and in some configurations may be a live video feed of the building to show current conditions. Space indicators 628 may provide user-configurable options related to the spaces and/or may include a link that may be selected to navigate to a view specifically for each space.

User-configurable options 620 allow a user to input selections, overrides, settings, schedules, and other controls decisions to the BMS control building equipment. For example, "Chiller 1", depicted by chiller graphic 630, is presented with a user-configurable option in the form of on/off toggle 632. When the on/off toggle 632 is toggled to on, "Chiller 1" is on (i.e., powered up, performing or ready to perform chilling functions), and when the toggle 632 is toggled to off, "Chiller 1" is off (i.e., powered down). An on/off toggle 634 is also provided for "Boiler 2" 636, for example. As another example, a temperature setting box 638 labelled "Freezer 1 Temperature" is provided to allow a user to change the temperature setpoint for "Freezer 1." In response to a user entry of a new temperature setpoint in temperature setting box 634, "Freezer 1" is controlled, via various components of a BMS (e.g., BMS 400, BMS 500) to alter the temperature of Freezer 1. A user can thereby use the user-configurable options 620 to control building equipment using the BMS user interface 600.

As shown in FIG. 6, the selected view 604 includes numerous user-configurable options 620, as may be typical of the hundreds or thousands of views accessible, as mentioned above, in the BMS user interface 600 by using navigation tree 602. Thus, thousands of user-configurable options may be accessible via the BMS user interface 600, an overwhelming number for a user to sort, evaluate, and understand.

In operation, many user-configurable options are rarely or infrequently changed by a user from a standard or default setting (e.g., a normal schedule of value or status changes), with only a limited number of user-configurable options altered between any two points in time (e.g., between a current system state and a previous system state). These altered user-configurable options may be the most useful for a user to see in the BMS. For example, altered user-configurable options may be the most likely options to need later alterations, might illuminate what has changed since the user's last shift managing the BMS to quickly bring the user up-to-date, and can show a comparison between a current configuration and other times of interest like a severe weather event or a maintenance event.

To allow a user to better view this set of more-relevant user-configurable options, BMS user interface 600 includes delta mode button 606 that allows the user to request to enter a view that filters user-configurable options to only show user-configurable options which have been altered as compared to a previous system state. Delta mode button 606 may be located in the upper right corner of BMS user interface 600 near a search button 650, a graph button 652, a notifications indicator 654, and a user account button 656. Delta mode button 606 is configured to be selected (e.g., clicked, touched) by a user and to cause a delta mode entry portal 700 as shown in FIG. 7 to be launched in response. In some embodiments, the delta mode button 606 can also be selected by inputting a keyboard shortcut, for example via a keyboard of one of the client devices 504.

FIG. 7 shows delta mode entry portal 700 as a pop-up in BMS user interface 600, obstructing a portion of selected view 604. Delta mode entry portal 700 is configured to allow a user to choose a comparison system state (i.e., the combination of user-configured options in the BMS at a different point in time) to compare to the current system state. As shown, delta mode entry portal 700 allows a user to choose a comparison system state by either specifying a date and time of the comparison system state (i.e., to compare against the system state at that date and time) or by selecting an event tag (i.e., to compare against the system state as configured during a notable event).

To facilitate date and time entry, delta mode entry portal 700 includes date entry box 702 and time entry boxes 704. Date entry box 702 is configured to receive numerical input of a month, day, and year. In some embodiments, selecting date entry box 702 launches a date picker in the form of a calendar. Time entry boxes 704 are configured to receive numerical input of the time in hours and minutes, and an indication of the desired time zone. Time entry boxes 704 may include a drop-down menu or other feature that allows the selection of a time without the need for free-form numerical entry (i.e., so that a keyboard or similar device is not required). In some embodiments, a date and time can be picked by selecting a duration (e.g., 8 hours, 1 day, 1 week, 1 month) to choose the comparison system state from that amount of time before the current time. In some embodiments, a default date and time of 24 hours earlier than the present is preset in the delta mode entry portal 700 and/or prechosen to launch delta mode for the default date and time without entering delta mode entry portal 700.

To facilitate the selection of an event tag, delta mode entry portal 700 includes a tag search box 710, tag name box 712, a tag date box 714, and a tag category box 716. The event tags provide shortcuts to notable, interesting, or particularly relevant previous system states that a user might want to compare the current state to, for example corresponding to a severe weather event, a fire drill, a maintenance period, an instance of standard/ideal system operation, or any other interesting event. The tag name box 712 contains a list of event tag names. Event tag names are labels for event tags that describe the event or occurrence that corresponds to an interesting or relevant comparison system state saved with an event tag. For example, tag name "Annual Chiller Maintenance" 718 indicates that the event tag is linked to a date and time when the system state was configured to allow for the maintenance of chillers. A user may want to select the "Annual Chiller Maintenance" event tag to compare the current system state to the "Annual Chiller Maintenance" system state in order to see what needs to be changed to prepare for an upcoming round of chiller maintenance. Tag search box 710 allows a user to search the tag name box by keyword to locate an event tag of interest.

The tag date box 714 and the tag category box 716 provide options for navigating and searching the available event tags. Tag date box 714 is useful when the rough, but not exact, date of an event tag is known (i.e., such that the date and time entry is not ideal), but the name of the event tag is unknown. For example, a user might remember that a particularly hot week in the previous summer necessitated the alteration of many user-configurable options, but may not remember the exact date or time. The user can sort the tag date box 714 by date to look for an event tag corresponding to that week to find, for example, tag name "Heat Wave" 720. Tag category box 716 may also be useful in finding relevant event tags, as it indicates a category of each event tag, such as "weather," which, for example, may be useful to a user looking for an event tag related to a heat wave or a snow emergency. An event tag can be selected by clicking, tapping, or otherwise selecting a tag name in tag name box 712 on an entry in the tag date box 714 or tag category box 716.

In some embodiments, the delta mode entry portal 700 includes a selection configured to allow a user to create a new event tag corresponding to the current system state or to a previous system state with a known date and time. The user may be prompted to input a tag name and tag category for the new event tag. In some embodiments, the BMS may also auto-generate event tags based on substantial changes in the user-configurable options or other criteria.

Once either an event tag or a date and time is selected, the user may then select a view delta mode button 730 included in the delta mode entry portal 700. In response, a delta view mode, as shown in FIG. 8 and described in detail below, is generated that compares the current system state to the historical system state corresponding to the selected event tag or date and time.

FIG. 8 shows BMS user interface 600 in delta view mode. More particularly, as indicated by title 800, FIG. 8 shows a delta view mode in which the current system state is compared to the historical system state corresponding to an event tag titled "Spring Break" (i.e., the "Spring Break" system state). In selected view 604, all user-configurable options that are set the same in the "Spring Break" system state and the current system state are hidden from view, such that only those user-configurable options which are set differently in the current system state as compared to the "Spring Break" system state are shown in selected view 604. For example, the "Chiller 1" on/off toggle 632 shown in FIG. 6 is hidden in delta view mode, indicating that the "Chiller 1" on/off toggle 632 was set to the same setting (i.e., either on or off) in both the current system state and the "Spring Break" system state. In contrast, the "Boiler 2" on/off toggle 634 is shown in delta view mode, indicating that the "Boiler 2" on/off toggle 634 has been switched from on to off (or vice versa) since the time of the "Spring Break" event tag. With many user-configurable options hidden in delta view mode, the user is left with a less-cluttered interface that shows a limited set of user-configurable options. This limited set may be easier to understand and analyze as compared to the full set shown in FIG. 6. In some embodiments, the BMS user interface 600 is configured to also display each user-configurable option for the comparison system state (e.g., the "Spring Break" system state), in order to provide side-by-side comparison of particular settings.

In delta view mode, as shown in FIG. 8, navigation tree 602 is pruned to remove entries that lead to views that only contain hidden user-configurable options. That is, the entries remaining on the navigation tree 602 in FIG. 8 are those entries that may be selected to navigate to a view, such as selected view 604, that shows user-configurable options that are different in the current system state as compared to "Spring Break" system state. A user is thus directed to only those views with visible user-configurable options, and is saved from clicking through a large number of empty views (e.g., those for which all user-configurable options are set the same in the current system state and the comparison system state). The pruned navigation tree 602 as shown in 604 also gives a quick overview of which buildings, spaces, or equipment have altered user-configurable options between the current system state and the comparison system state (e.g., the "Spring Break" system state).

In some cases, one or more user-configurable options and/or corresponding devices of building equipment, spaces, or buildings were added or removed from the BMS between the time of the comparison system state and the current time (e.g., due to construction projects, renovations, equipment updates, etc.). Such user-configurable options are not present in both the current state and the comparison state, and so cannot be compared like other user-configurable options described above. According to various embodiments, added and/or removed user-configurable options are shown in delta view mode, are hidden in delta view mode, or can be selectively shown and hidden using an option in delta view mode entry portal 700. Similarly, according to various embodiments, added or removed buildings, spaces, and building equipment may also be shown, hidden, or otherwise noted in delta view mode, for example as selected by a user using an option in delta view mode entry portal 700.

Delta view mode can be exited by selecting exit delta mode button 810 to return to the original BMS user interface 600 as shown in FIG. 6. In some embodiments, the BMS user interface 600 includes a delta mode toggle that allows the user to switch quickly back and forth between delta view mode and the normal view without reselecting a comparison state using delta mode entry portal 700 every time. The BMS user interface 600 thereby allows a user to quickly and easily identify altered user-configurable options to see the most likely options to need later alterations, to illuminate what has changed since the user's last shift managing the BMS to quickly bring the user up-to-date, and to show a comparison between a current system state and a comparison system state to help a user to configure the current system state to address a similar situation as address by the comparison system state.

Figure 9:
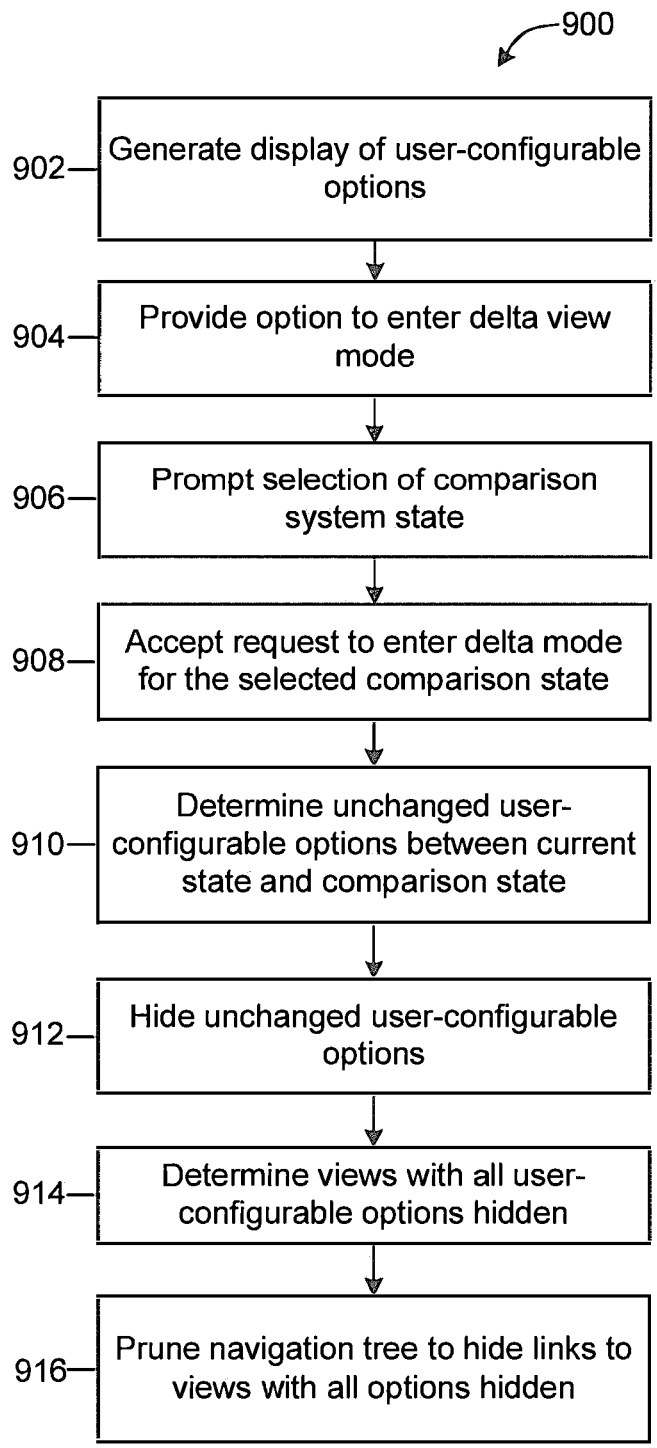
FIG. 9 is a flowchart of a process for generating the graphical user interfaces of FIGS. 6-8, according to some embodiments.

Referring now to FIG. 9, a flowchart showing a process 900 for generating the BMS user interface of FIGS. 6-8 is shown, according to an exemplary embodiment. Process 900 may be carried out by BMS 400 and BMS 500. More particularly, for example, process 900 may be carried out by system manager 502 in communication with user devices 504, as shown in FIG. 5.

At step 902, the BMS generates a graphical user interface of user-configurable options, for example as shown in FIG. 9. The graphical user interface of user-configurable options shows the current setting of each user-configurable option, for example that a chiller is set to "on" or the temperature of a freezer is set to a particular temperature. The graphical user interface also includes a navigation tree (for example, navigation tree 602 of FIG. 6), that provides a list of other available views of user-configurable options. In some embodiments, the graphical user interface is configured to only provide those options that a particular user has permission/authority to alter.

At step 904, the BMS provides an option in the user interface to enter delta view mode. This option may be provided as a button on the graphical user interface generated in step 902, or may take any other suitable form. In response to a user selecting the option to enter delta view mode, the BMS prompts a user to select a comparison system state at step 906. As described above with reference to FIG. 7, the prompt may be a user-interface portal or module that allows a user to select a date/time (e.g., by picking a date, by choosing an amount of time before the present) or select an event tag. In some embodiments, the BMS allows the user to pick two comparison states, such that the difference between those two states will be shown in delta view mode, rather than the default comparison to the current system state. Once the user has selected a comparison system state, at step 908 the BMS accepts a request to enter delta view mode for the selected comparison state.

At step 910, the BMS determines which user-configurable options are unchanged (i.e., set/configured the same) in the comparison system state and the current system state. The BMS may access a database of historical system states to build this comparison. The database may save a history the full system state, for example at regular intervals, or may store a log of alterations to user-configurable options that can be followed to determine the differences between the current system state and the comparison system state. In some embodiments, previous system states are only saved when a user requests to create an event tag, such that delta view mode may only be available for event tags.

Using the unchanged user-configured options identified in step 910, the BMS then hides the unchanged user-configurable options in the user interface in step 912. Step 912 involves generating a new graphical user interface, or may involve obscuring the changed user-configurable options visible in the graphical user interface generated in step 902.

In step 914, the BMS determines the views for which all user-configurable options are hidden (i.e., those views for which all user-configurable options are unchanged between the compassion system state and the current system state). The BMS may make this determination by directly using a list of the unchanged user-configurable options as generated by step 910, or by looking at which views still include user-configurable options after the operation of step 912. At step 916, the navigation tree of the graphical user interface is then pruned to hide links/entries for the views that have all user-configurable options hidden. Process 900 thereby provides a graphical user interface with a delta view mode of user-configurable options in a BMS.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
   building equipment that operate to affect a variable state or condition in a building;
   an interface generator configured to generate a graphical user interface, the graphical user interface comprising:
      user-configurable options associated with the building equipment, each user-configurable option having a current setting, the current settings of the user-configurable options defining a current system state; and
      a delta view mode button configured to allow a user to request to enter a delta view mode relative to a comparison system state, the comparison system state defined by a comparison setting for each of the user-configurable options in effect at a user-selected historical time; and
   a system manager configured to identify one or more unchanged user-configurable options by determining the user-configurable options for which the current setting matches the comparison setting;
   wherein interface generator is further configured to hide the unchanged user-configurable options in the graphical user interface in response to a user request to enter the delta view mode.

2. The building management system of claim 1, wherein the user interface further comprises a navigation tree comprising an entry for each of a plurality of views of the user-configurable options, and wherein the interface generator is further configured to:
   determine that the user-configurable options shown in an unchanged view of the plurality of views are unchanged user-configurable options; and
   hide the unchanged view on the navigation tree in response to a determination that the user-configurable options shown in the unchanged view are unchanged user-configurable options.

3. The building management system of claim 1, wherein the user interface further comprises a delta view mode entry portal that allows a user to choose the comparison system state from a plurality of stored comparison states by selecting the user-selected historical time.

4. The building management system of claim 3, wherein the delta view mode entry portal allows the user to select the user-selected historical time by providing an option to select an event tag corresponding to a saved event.

5. The building management system of claim 3, wherein the delta view mode entry portal allows the user to select the user-selected historical time by allowing the user to input a date and a time.

6. The building management system of claim 1, wherein the user-configurable options correspond to operations of the building equipment;
   wherein the user interface allows a user to input a setting change for one of the user-configurable options; and
   wherein the system manager is configured to control the building equipment to conform the operations of the building equipment to the setting change.

7. The building management system of claim 1, further comprising a database configured to store a plurality of selectable comparison system states corresponding to a plurality of historical times, the plurality of selectable comparison system states comprising the comparison system state.

8. A method for managing building equipment in a building management system, the method comprising:
   operating building equipment to affect a variable state or condition of a building;
   generating a graphical user interface comprising user-configurable options associated with the building equipment, each user-configurable option having a current setting, the current settings of the user-configurable options defining a current system state;
   accepting a request to compare the current system state to a comparison system state, the comparison state defined by a comparison setting for each of the user-configurable options in effect at a user-selected historical time;
   identifying one or more unchanged user-configurable options by determining the user-configurable options for which the current setting matches the comparison setting; and
   hiding the one or more unchanged user-configurable options from the graphical user interface.

9. The method of claim 8, wherein the graphical user interface further comprises a navigation tree comprising links to a plurality of views, each view showing one or more user-configurable options, the method further comprising:
   determining that the user-configurable options shown in an unchanged view are unchanged user-configurable options; and
   hiding a link to the unchanged view on the navigation tree.

10. The method of claim 8, further comprising accepting a user input to change a user-configurable option corresponding to the building equipment; and
   controlling the building equipment to conform to the changed user-configurable option.

11. The method of claim 8, wherein accepting the request to compare the current system state to the comparison system state comprises receiving a user selection of the user-selected historical time by:
   providing, on the graphical user interface, an option to select an event tag corresponding to a saved event; and
   selecting the user-selected historical time as a time of the saved event in response to a user selection of the event tag.

12. The method of claim 8, wherein accepting the request to compare the current system state to the comparison system state comprises:
   providing, on the graphical user interface, an option to specify a preceding date and time as the historical time; and
   selecting the comparison system state for the historical time in response to a user specification of the preceding time.

13. The method of claim 8, comprising storing a plurality of selectable comparison system states corresponding to a plurality of historical times, the plurality of selectable comparison system states comprising the comparison system state.

14. A method comprising:
   operating equipment in conformance with a current system state defined by current settings of a plurality of user-configurable options;
   generating a user interface comprising the plurality of user-configurable options;
   altering the user interface to compare the current system state to a comparison system state, the comparison system state defined by comparison settings of the user-configurable options, wherein the equipment operated in conformance with the comparison settings at a user-selected historical time, wherein altering the user interface comprises:
  identifying one or more altered user-configurable options by determining the user-configurable options for which the current setting is the same as the comparison setting; and
  showing the one or more altered user-configurable options on the user interface and hiding non-altered user-configurable options on the user interface.

15. The method of claim 14, wherein the user interface further comprises a plurality of views, each view comprising a portion of the plurality of user-configurable options, and a navigation tree comprising a link to each of the plurality of views and configured to allow a user to select each link to cause the user interface to show the corresponding view, the method further comprising:
  identifying one or more altered views from the plurality of views by determining that the portion of user-configurable options shown on each of the altered views includes at least one of the one or more altered user-configurable options; and
  showing the links to the one or more altered views on the navigation tree and hiding links to one or more non-altered views.

16. The method of claim 14, further comprising allowing a user to select the comparison state by:
  providing, on the user interface, an option to select an event tag corresponding to a tagged system state; and
  defining the tagged system state as the comparison system state in response to a user selection of the event tag via the user interface, the event tag associated with an event that occurred at the user-selected historical time.

17. The method of claim 14, further comprising allowing a user to select the comparison state by:
  providing, on the user interface, a field configured to receive a user specification of a preceding date; and
  defining the user-selected historical time based on the user specification of the preceding date.

18. The method of claim 14, wherein the user interface allows a user to change the current system state to an updated system state by altering the current setting of one of the user-configurable options;
  the method further comprising controlling the equipment to operate in conformance with the updated system state in response to a user change of the current system state.

19. The method of claim 14, further comprising identifying an added user-configurable option by determining a user-configurable option that is included in the current system state and not included in the comparison system state; and
  providing an option for a user to select between showing and hiding the added user-configurable option; and
  hiding the added user-configurable option on the user interface in response to a user selection to hide the added user-configurable option and showing the added user-configurable option on the user interface in response to a user selection to show the added user-configurable option.

20. The method of claim 14, comprising storing a plurality of selectable comparison system states corresponding to a plurality of historical times, the plurality of selectable comparison system states comprising the comparison system state.

* * * * *